United States Patent [19]

Tain et al.

[11] Patent Number: 5,608,638

[45] Date of Patent: Mar. 4, 1997

[54] DEVICE AND METHOD FOR AUTOMATION OF A BUILD SHEET TO MANUFACTURE A PACKAGED INTEGRATED CIRCUIT

[75] Inventors: Alexander C. Tain, Milpitas; Georg Kuhnke; Kris Shih-Yen Chou, both of San Jose, all of Calif.

[73] Assignee: Advanced Micro Devices, Sunnyvale, Calif.

[21] Appl. No.: 384,262

[22] Filed: Feb. 6, 1995

[51] Int. Cl.⁶ .......................... G06F 19/00; G06F 17/50
[52] U.S. Cl. ........................ 364/468.28; 364/491
[58] Field of Search .......................... 364/468, 488–491, 364/578, 468.28, 468.03; 437/7, 8, 50, 180; 395/155–161; 29/739–741, 825

[56] References Cited

U.S. PATENT DOCUMENTS

| | | | |
|---|---|---|---|
| 4,864,514 | 9/1989 | Yamanaka et al. | 364/489 |
| 5,337,467 | 8/1994 | Kogure et al. | 29/840 |
| 5,465,217 | 11/1995 | Yip et al. | 364/489 |
| 5,498,767 | 3/1996 | Huddleston et al. | 437/8 |

*Primary Examiner*—Joseph Ruggiero
*Attorney, Agent, or Firm*—Lowe, Price, LeBlanc & Becker

[57] ABSTRACT

A system and method which includes a user interface for automation of the build sheet is provided. The database icon or command of the user interface is executed to select an appropriate package for an IC chip, and a blank bond master is downloaded to the hard disk of the work station. The engineer can choose either the suggest die icon/command or the die cleaner icon/command to create an image file of the die pad ring based on a mask layer best representative of the die pad ring. Thereafter, the die pads and bond fingers are identified and a net list is complied when the wire bonding icon or command is executed to create a bonding device diagram without the die image. A die image is created based on a mask layer best representative of the die using either the TIF to AutoCAD icon/command or the GDS to AutoCAD icon/command. The Die Image Merge icon/command merges the die image with the bonding device diagram to complete the build sheet. Thereafter, an IC package may be fabricated based on the bonding device diagram.

35 Claims, 13 Drawing Sheets

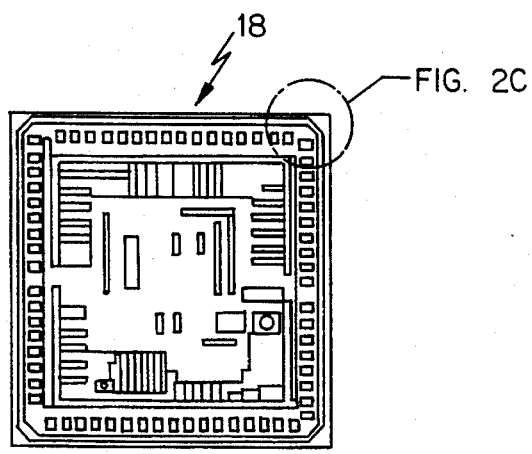
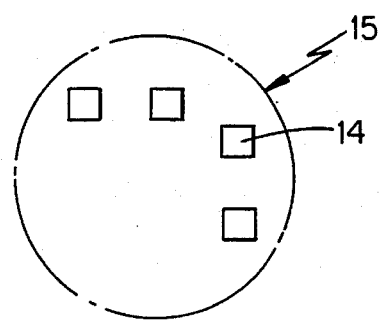
FIG. 2B
FIG. 2C
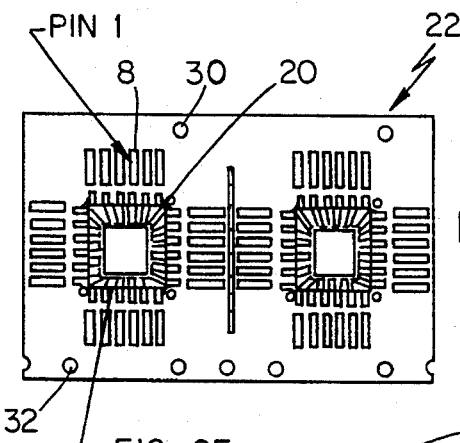
FIG. 2D
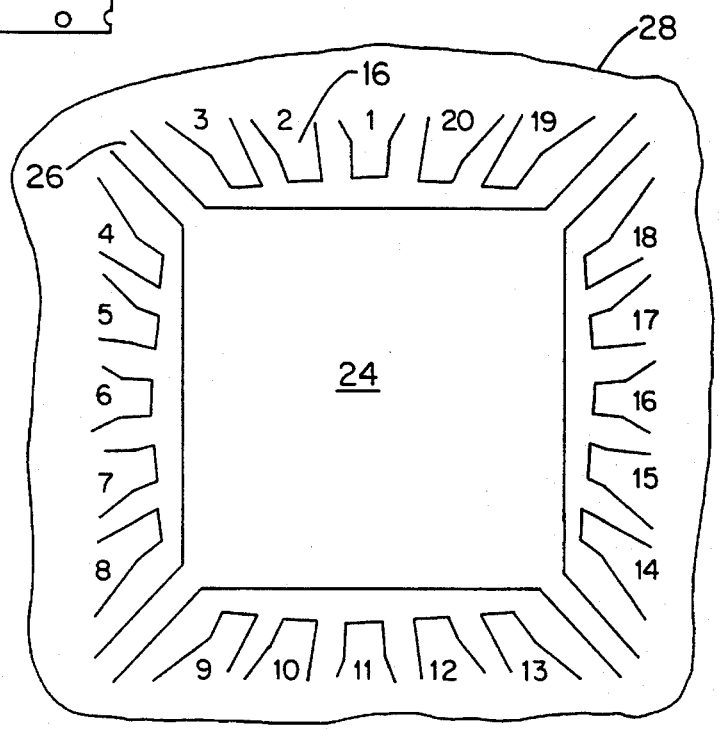
FIG. 2E

FIG. 3D

BLANK QUERY FORM

PACKAGE FAMILY

- PQFP
- PLCC
- PDIP
- CERDIP

SELECTION  SELECT_ALL

LEAD COUNT & DIE SIZE

CLEAR_ALL

| LEAD COUNT | PART NUMBER | QUAL STATUS | TOOL | DIE ATTACH X | DIE ATTACH Y | BODY X | BODY Y | PKG OUTLINE |
|---|---|---|---|---|---|---|---|---|
| 168 | 09-0023008 | QUALIFIED | ETCHED | 0.484 | 0.484 | 28.000 | 28.000 | EIAJ |
| 172 | 09-0023680 | QUALIFIED | ETCHED | 0.490 | 0.490 | 28.000 | 28.000 | EIAJ |
| 208 | 09-0024505 | PROTOTYPE | ETCHED | 0.506 | 0.506 | 28.000 | 28.000 | EIAJ |
| 216 | 09-0021664 | PROTOTYPE | ETCHED | 0.472 | 0.472 | 28.000 | 28.000 | EIAJ |
| 216 | 09-0023735 | QUALIFIED | ETCHED | 0.539 | 0.539 | 28.000 | 28.000 | EIAJ |

DOWNLOAD BUILDSHEET

QUIT/CLOSE

| | |
|---|---|
| 1 | 2 |
| 2 | 0 |
| 3 | 4,4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |
| 16 | 17 |
| 17 | 18, 19 |
| 18 | 0 |
| 19 | 20 |
| 20 | 21 |
| 21 | 23, 23, 23 |
| 22 | 24 |
| 23 | 25 |
| 24 | 26 |
| 25 | 26 |
| 26 | 28 |
| 27 | 29 |
| 28 | 30 |
| 29 | 31, 31 |
| 30 | 32 |
| 31 | 0 |
| 32 | 34 |
| 33 | 35 |
| 34 | 37 |
| 35 | 38 |
| 36 | 39, 39 |
| 37 | 40 |
| 38 | 41 |
| 39 | 42 |
| 40 | 43 |
| 41 | 44, 44 |

DEVICE AND METHOD FOR AUTOMATION OF A BUILD SHEET TO MANUFACTURE A PACKAGED INTEGRATED CIRCUIT

TECHNICAL FIELD

This invention relates to the manufacturability of packaged integrated circuits and in particular, automation of the build sheet used in manufacture of a packaged IC.

BACKGROUND ART

IC chips are fragile, and cannot be exposed to air and particles which may cause destruction of the chips. As shown in FIG. 1, an IC chip 2 is glued by an epoxy paste 3 to an IC package 4 and encapsulated to protect the chip 2 from air and particles. Wires 6 connect the IC chip 2 to leads 8 of the IC package 4 for connection to a printed circuit board (not shown).

During a final stage of manufacturing of the IC package 4, a bonding device diagram 10, as shown in FIG. 2A, is required to show the wire connections 12 between a plurality of die pads 14 forming a die pad ring 15 at the periphery of a die image plot 18 (see also FIGS. 2B and 2C) and bond fingers 16 which are generally connected to the leads 8 of the package 4. Using the bonding device diagram, the wires 6 are connected between the die pads 14 and the bond fingers 16 during manufacture of the packaged IC.

The term "build sheet," i.e., a paper sheet instructing how to build, is generally used to refer to the bonding device diagram. In the first step of making the build sheet, a design engineer plots out the die image plot 18, as shown in FIG. 2B, of an IC chip 2 which has been designed and is ready to be manufactured. The die image plot 18 is an enlarged image of the IC chip 2 which is plotted out as large as possible on a 8.5"×11" paper to the same scale as a blank bond master (described hereinafter) which can be in a scale of up to 20 or more times the actual IC chip size. Thereafter, the design engineer contacts a package engineer for the availability of an existing package for the IC chip 2. To save costs and production time, an existing package is preferable to a redesigned package or a new package.

There are nine general package families:
(1) Plastic Quad Flat Pack (PQFP);
(2) Pin Grid Array (PGA);
(3) Plastic Leaded Chip Carrier (PLCC);
(4) Leadless Chip Carrier (LCC);
(5) Plastic Dual Inline Package (PDIP);
(6) Ceramic Dual Inline Package (CERDIP);
(7) Thin Small Outline Package (TSOP);
(8) Small Outline Integrated Circuit Sidebraze (SOIC); and
(9) Ceramic Quad (Cerquad).

As can be appreciated, the nine package families are exemplary, and not exclusive, since other package families exist or may be developed. Since each package family includes hundreds of different types of package layouts, sizes and lead count, each package engineer is assigned to know a certain number of package families.

If the design engineer is able to reach the package engineer, the design engineer informs the package engineer of the number of die pads 14 and the X and Y dimensions of the actual die size of the IC chip 2. The package engineer determines if the IC chip 2 will fit into a particular package based on the actual die size, and determines whether the die pads 14 can be bonded to the bond fingers 16 of a particular package based on the number of die pads 14.

Once an appropriate package has been chosen, the package engineer uses an AutoCAD program to draw an internal artwork 20 of a lead frame of the package, i.e., the outline of a central portion of a lead frame drawing 22. As shown in the lead frame drawing 22 of FIG. 2D, a series of lead frames is formed on a strip of metal with portions or sections of metal removed to define metal areas forming the bond fingers 16, die attach area 24, tiebar 26, leads 8, etc. The internal artwork 20 thereafter is expanded as much as possible on 8½"×11" paper to form a blank bond master, as shown in FIG. 2E.

However, the scales of the die image plot 18 of FIG. 2B and the blank bond master 28 of FIG. 2E have to be the same. For example, if the internal artwork 20 with the blank bond master 28 is 16 times the actual size, the die image plot 18 has to be 16 times the actual size. To achieve the same scale, a technician expands or shrinks the die image plot 18 and/or the internal artwork 20 using a photocopying machine. Thereafter, the technician uses a ruler to measure the dimensions of the photocopied internal artwork and die image plot. If the scales are not correct, the technician re-expands or reshrinks the die image plot and/or internal artwork and remeasures the dimensions. Such a process is repeated until the scales are the same. Repeated photocopying and remeasuring is time consuming and wasteful.

The blank bond master 28 outlines the die attach area 24, bond fingers 16 and the tiebar 26. The die attach area 24 is a metallic plate where the IC chip 2 will be glued during manufacturing of the IC package 4. The bond fingers 16, which are numbered, for example, from 1 through 20, are generally coupled to the leads 8, and the wires 6 connect the die pads 16 of the IC chip 2 to the bond fingers 16.

For PLCC packages, the lead frame drawing 22 is also used to properly align the blank bond master 28. The top single hole 30 and the two bottom holes 32 of the lead frame drawing 22 indicate the top and bottom of the lead frame, and "PIN 1" corresponds to bond finger 1. Without the lead frame drawing 22, the blank bond master 28 can be misaligned and the bond fingers 16 mislabeled before the wire bond. As can be appreciated, the same or different methods of alignment and labelling can be used for other package families.

Prior to gluing the die image plot 18 onto the blank bond master 28, the technician uses a ruler to measure X and Y die attach clearances, as shown in FIG. 2G, to meet the minimum requirement for the particular IC chip. The measured die attach clearance is divided by the scale to which the die image plot 18 and the bonding device diagram 10 have been expanded to arrive at the actual die attach clearance. The technician needs to experiment with the placement of the die image plot 18 on the die attach area 24 to assure that the die attach clearances are equal on each side and with top and bottom. The die image plot 18 is then glued onto the blank bond master 28, as illustrated in FIG. 2G.

Such die attach clearance is required to compensate for the overflow of the epoxy paste 3 during actual manufacturing of the IC package 4. Without the die attach clearances in PLCC packages, for example, the paste 3 may flow over the edge of the die attached area 24 and may act as particles to cause reliability problems. Generally, a large die attach clearance is preferable. However, the length of the wire 6 connecting the bond fingers 16 to the die pads 14 increases with increase in the die attach clearance. If a wire 6 is too long, the wire 6 will sag, rather than loop, as shown in FIG. 1, causing reliability problems. Hence, the die attach clearance and the wire length are counteractive, and a balance must be achieved between the die attach clearance and the wire length.

After the proper placement of the die image plot 18 on the blank bond master 28, multiple copies of the overlaid die image plot 18 and blank bond master 28 are made to preserve the original, and the design engineer uses a pencil and/or pen to draw the wire connections 12 between the bond fingers 16 and the die pads 14 to achieve the bonding device diagram 10, as illustrated in FIG. 2A. The drawing of the wires 12 is called "bonding on paper," which corresponds to the bonding of the wires 6 between the die pads 14 and the bond fingers 16 during manufacture. The letters N/C indicate no wire connection to a die pad 14 or a bond finger 16.

The bond fingers 16 or the die pads 14 can have a single bond, a double bond, a triple bond, etc. In FIG. 2A, for example, bond finger 1 is connected to two die pads, and hence, bond finger 1 is said to have a double bond and each die pad has a single bond. Two wires connect bond finger 6 to a single pad in the bonding device diagram, i.e., double bond to bond finger 6 and the die pad. When three wires connect bond finger 15 to three different die pads, bond finger 15 has a triple bond, and each die pad has a single bond. As can be appreciated, numerous variations of the wirebond are possible between the bond fingers and the die pads. Further, the number of die pads to the number of bond fingers can be the same or different.

Manual drawing of the wires causes various problems. As shown in the figures, the die pads 14 are very small areas even when the die image plot 18 is an expanded view of the actual IC chip 2. The die image plot 18 illustrated in FIG. 2B has approximately 80 die pads, and presently, the number of die pads ranges from 8 to 242. Even with an expanded die image plot, the die pads are very difficult to accurately locate and determine due to smearing of the die pad ring 15. The problem becomes severe as the number of die pads 14 increase. As can be appreciated, manual drawing of the wires 12 from the die pads to the bond fingers is extremely cumbersome and may be illegible.

As discussed above, the die attach clearance also must be sufficient to compensate for overflow of the epoxy paste, and a large die attach clearance is preferable. A larger die attach clearance increases the wire length, but wire length cannot exceed a maximum length to prevent sagging. To assure a proper wire length, the design engineer uses a scaled ruler to measure the length of the drawn wires to determine the actual length. If the maximum length is exceeded, the engineer has to redraw the wire and repeated drawing of the same wire may be required. The design engineer must also assure that no wires cross or touch one another to prevent shorting. If the design engineer encounters a situation where a wire crosses or touches another wire to connect a die pad to a bond finger, the engineer may be required to redraw one or all of the wires to assure that no wires cross or touch, and repeated drawing may be required. Such a process is time consuming.

The manual process of the build sheet also does not account for factors which occur during the actual manufacture of the IC package. One of the factors is the width of the wire 6 compared to the width of the die pad 14 and the bond finger 16. Although it is possible to draw multiple wires to a single die pad or bond finger, such bonding may not be possible during manufacturing. The width of the wires 6 may be too large for multiple bonding to a die pad 14 or a bond finger 16. Hence, multiple wires may not fit onto a single die pad or bond finger for a double bond, a triple bond, quadruple bond, etc. As a general rule, a single wire can be bonded to a properly designed die pad and bond finger meeting minimum design rules. The occurrence of such a problem may stop the manufacturing of the IC chip, and a new bonding device diagram becomes required prior to restarting the manufacturing process.

Further, the bonding device diagram 10 is a two dimensional drawing of the connection, and hence, the wire connections 12 from the die pads 14 to the bond fingers 16 in the bonding device diagram 10 are in a straight line. However, as shown in FIG. 1, the wires 6 are looped in three dimensions, and a bond wedge or tail (not shown) is created at the end of the wire 6 bonded to the die pad 14. Assuming that there is an imaginary vertical line perpendicular to a die pad 14, an angle between the imaginary vertical line and the looped wire must stay within a certain range. The bond wedge may cross over to the next die pad if the angle is too large, and cause "shortout" of the IC chip 2. The manual process of the build sheet creation does not account for such a factor, and the manufactured IC chip with exceeded angle may have to be discarded.

On the bonding device diagram 10, the engineer types in the dimension of the die attach area 24 in inches, and if the dimension of the die attach area 24 is in microns, the engineer must also indicate the inch equivalent. Other information, such as the device number and metal mask number of the lead frame, must be provided on the bonding device diagram 10 prior to sending the bonding device diagram 10 for approval. Manual insertion of such information is also time consuming.

The integrated chip is then packaged using the approved bonding device diagram as a reference for bonding the wires. As discussed above, various problems may arise due to the bonding device diagram inaccurately showing the wire connections 12 between the die pads 14 and the bond fingers 16. The problem may be undiscovered during the manufacturing process, leading to reliability problems when the IC package is connected to the printed circuit board. Further, if the problem is discovered, the manufacturing process may be delayed until a new bonding device diagram is provided. As can be appreciated, even the revised bonding device diagram may have problems, and the bonding device diagram may have to be created over and over again until the problems discussed above have been corrected.

The conventional manual process of the build sheet is inefficient, costly, and illegible. The present invention solves the shortcomings of the conventional process.

DISCLOSURE OF THE INVENTION

An object of the present invention is to automate the build sheet operation.

Another object of the invention is to provide an efficient, inexpensive process for the creation of a clear and legible build sheet.

A further object of the present invention is to provide a user interface for automation of the build sheet.

A further object of the invention is to provide a system and method for creating a bonding device diagram which decreases the time to create an accurate bonding device diagram used to manufacture IC packages.

Additional objects, advantages and other features of the invention will be set forth in part in the description which follows and in part will become apparent to those having ordinary skill in the art upon examination of the following or maybe learned from the practice of the invention. The object and advantages of the invention may be realized and obtained as particularly pointed out in the appended claims.

According to the present invention, the foregoing and other objects are achieved in part by a program for automating a build sheet used in the manufacture of integrated circuit (IC) packages, the program controlling a system operating in X-Windows having a computer coupled to a plurality of work stations and a database storing images of blank bond masters and die rings, the program comprising a first routine to select an image file of a blank bond master having an image of a plurality of bond fingers and a die attach area, a second routine to select a die ring image having an image of a plurality of die pads of an IC chip, and a third routine to automatically illustrate wire connections between the die pads and bond fingers to form a bonding device diagram.

Another aspect of the invention is a system having a central computer coupled to a central database and a plurality of work stations for automating a build sheet used in the manufacture of integrated circuit (IC) packages to connect wires between die pads of an integrated circuit chip and bond fingers of a package, the system comprising means for creating a blank bond master having an image of a plurality of bond fingers and a die attach area, means for creating a die ring having an image of a plurality of die pads of the IC, and means for automating symbolic wire connections between the die pads of the die pad ring and the bond fingers of the blank bond master to create a bonding device diagram.

A further aspect of the invention is a method for a build sheet used during manufacturing of integrated circuit (IC) packages to connect wires between die pads of an IC chip and bond fingers of a package, the method comprising the steps of selecting an image file of a blank bond master having an image of a plurality of bond fingers and a die attach area, selecting a die ring image having an image of a plurality of die pads of the IC chip, and connecting automatically the wires between the die pads and bond fingers to form a bonding device diagram.

BRIEF DESCRIPTION OF DRAWINGS

The invention will be described in detail with reference to the following drawings in which like reference numerals refer to like elements wherein:

FIG. 2B depicts a die image plot of a conventional build sheet;

FIG. 2C is an exploded view of die pads forming a die pad ring of the die image plot illustrated in FIG. 2C;

FIGS. 2D and 2F are illustrations of a lead frame drawing;

FIG. 2E is a blank bond master of a conventional build sheet;

FIG. 3D is an illustration of a user interface when a specific DataBase icon/command is executed;

BEST MODE FOR CARRYING OUT THE INVENTION

Figure 3A:
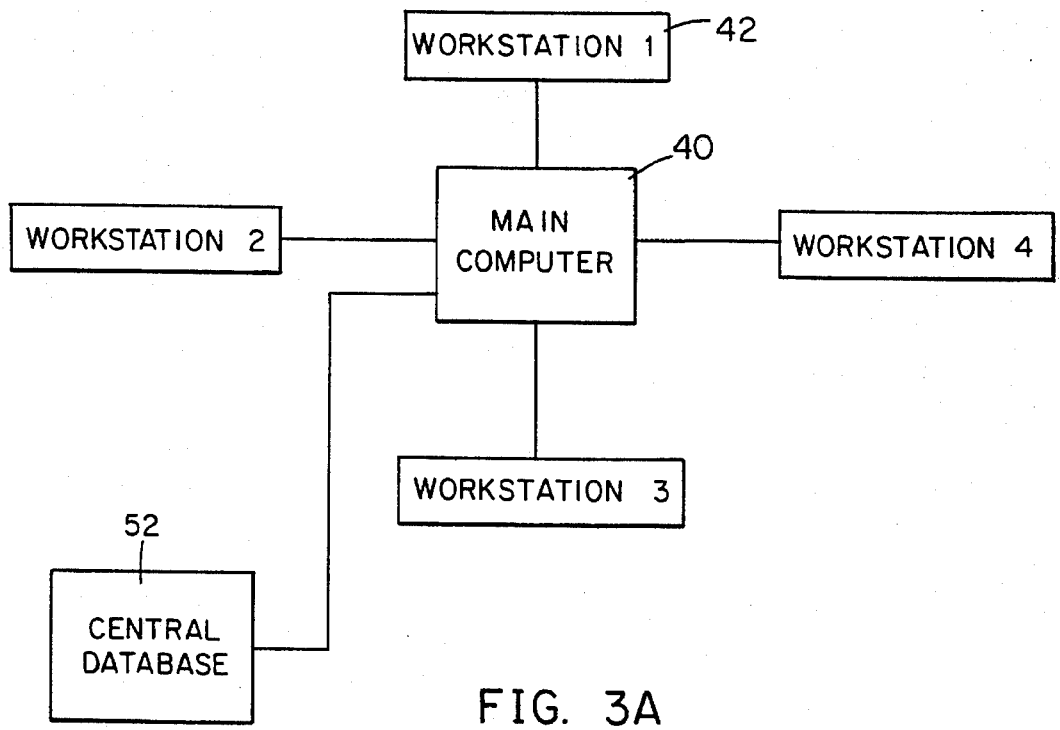
FIG. 3A is a block diagram of a system to implement the present invention.
Figure 3B:
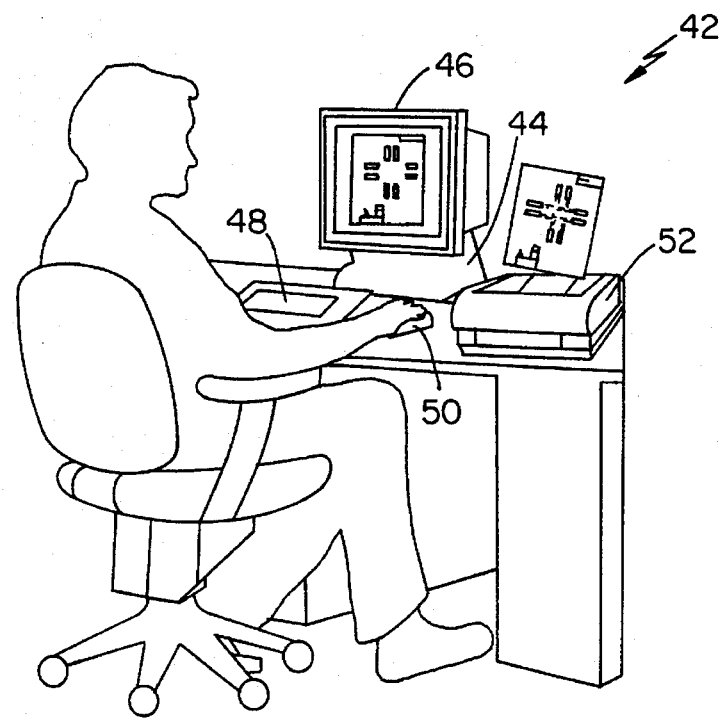
FIG. 3B shows a work station included in the system of FIG. 3A.

The present invention provides a system and method for a user interface to automate the build sheet and solve the aforementioned problems of the prior art in manufacturing packaged IC devices. As shown in FIG. 3A, the system comprises a central computer 40 (a server) connected to a plurality of work stations 42. The server 40 and each work station 42 are given a unique name for identification. The work stations 42 are UNIX SUN work stations in the preferred embodiment; however, as can be appreciated, these work stations 42 can be any work stations such as HP, IBM, STACK, etc. Each work station 42 comprises a microcomputer 44 with a display screen 46 and a keyboard 48, a mouse 50 and a printer 52, as illustrated in FIG. 3B. In the preferred embodiment, X-Window is used to process data, wherein programs and all the processing of data are run in the server 40, but the program output is displayed at the work station 42, i.e., the work station is a display server. With X-Windows, a program can be easily updated in the server 40, rather than in every work station 42.

The server 40 is also linked to a central database 52 which stores the blank bond masters and die ring image (described hereinafter). The central database 52 can be located at a remote central station, e.g., the main computer 40 can be located at Austin, Tex. while the central database 52 is located at Sunnyvale, Calif. As can be appreciated, other main computers connected to work stations can access the central database.

Figure 3C:
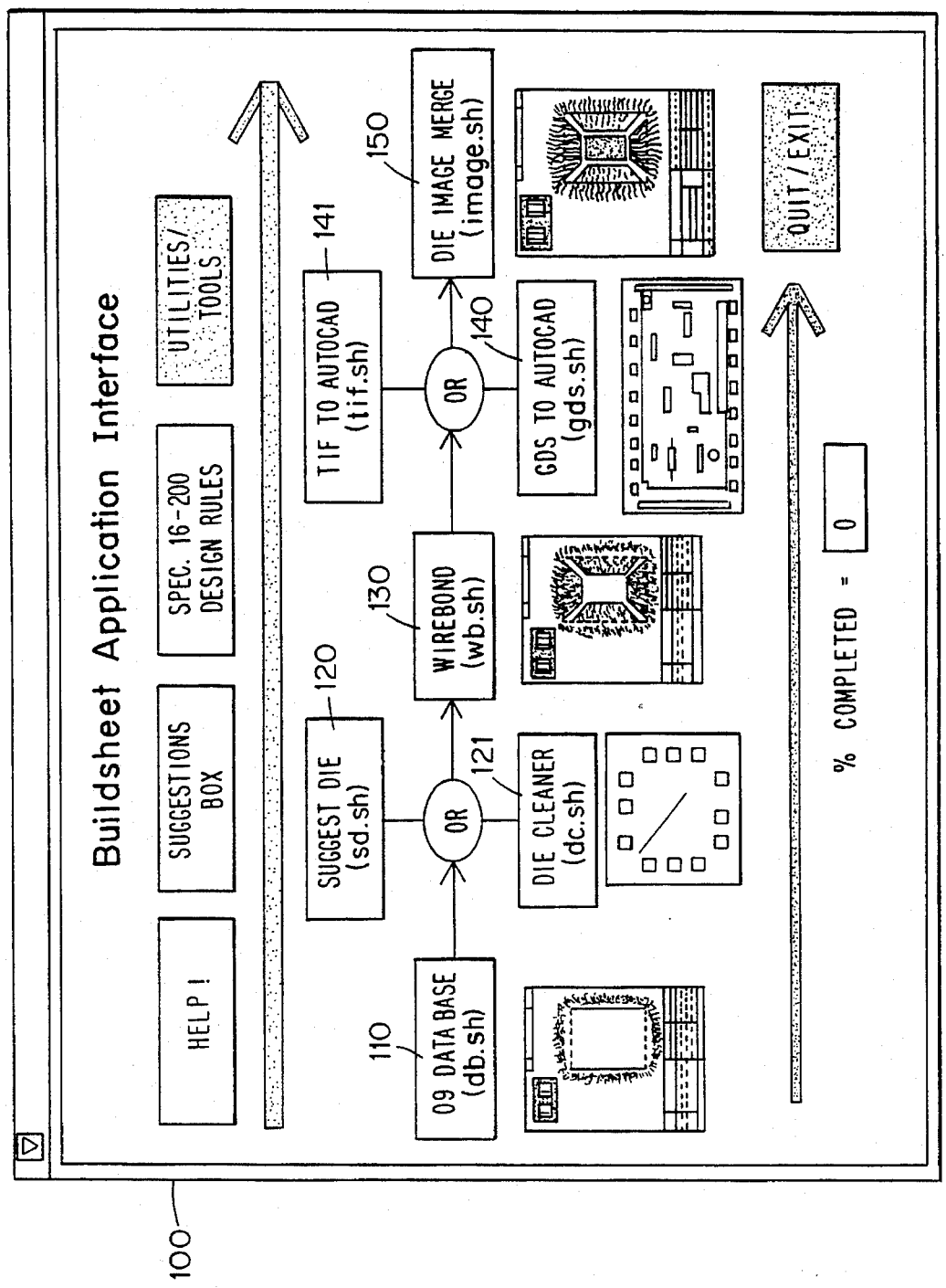
FIG. 3C is an illustration of a user interface of the present invention.
Figure 4A:
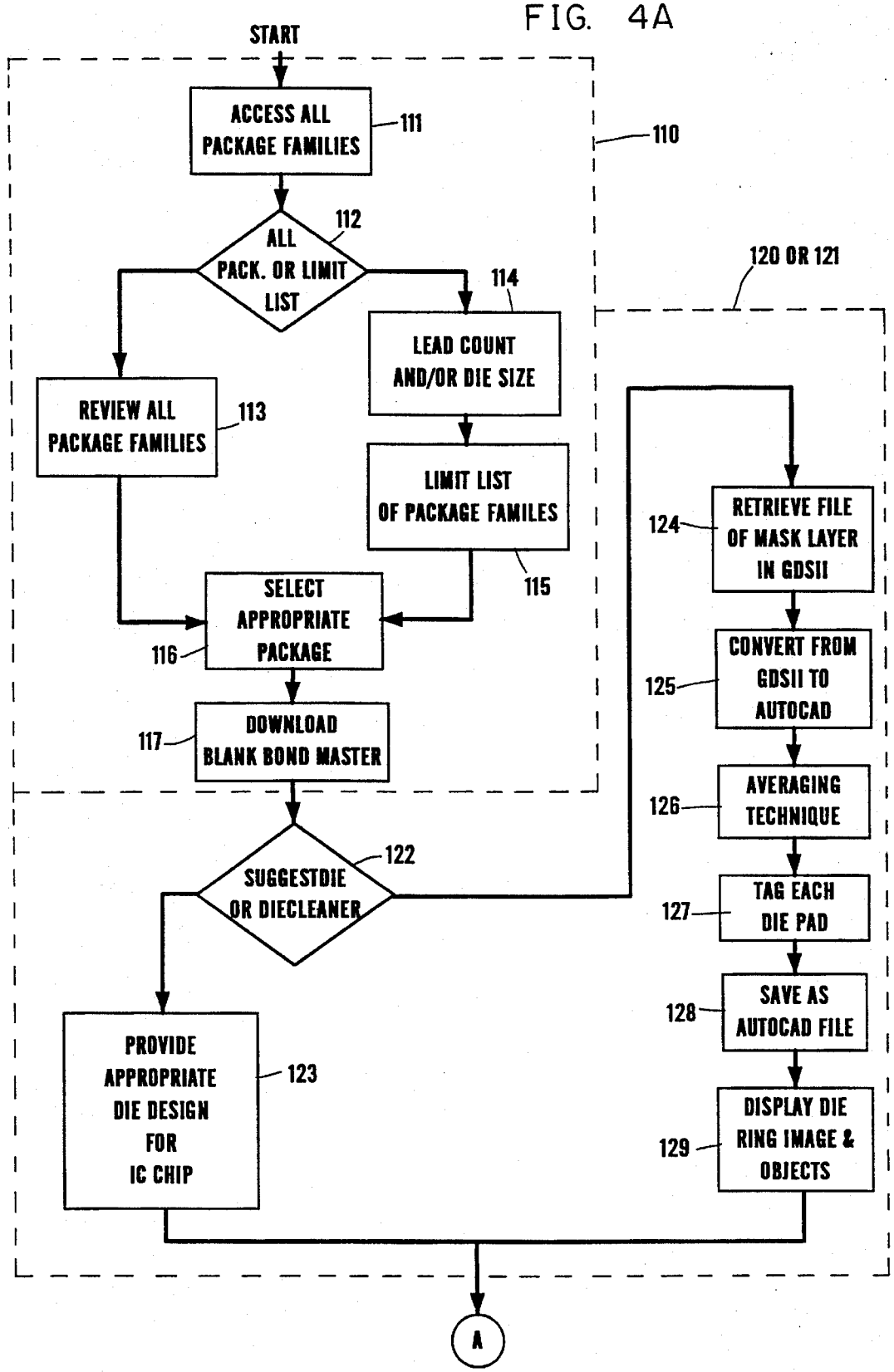
FIGS. 4A–4C comprise a flow chart for using a user interface implemented in the system of FIG. 3A.
Figure 4B:
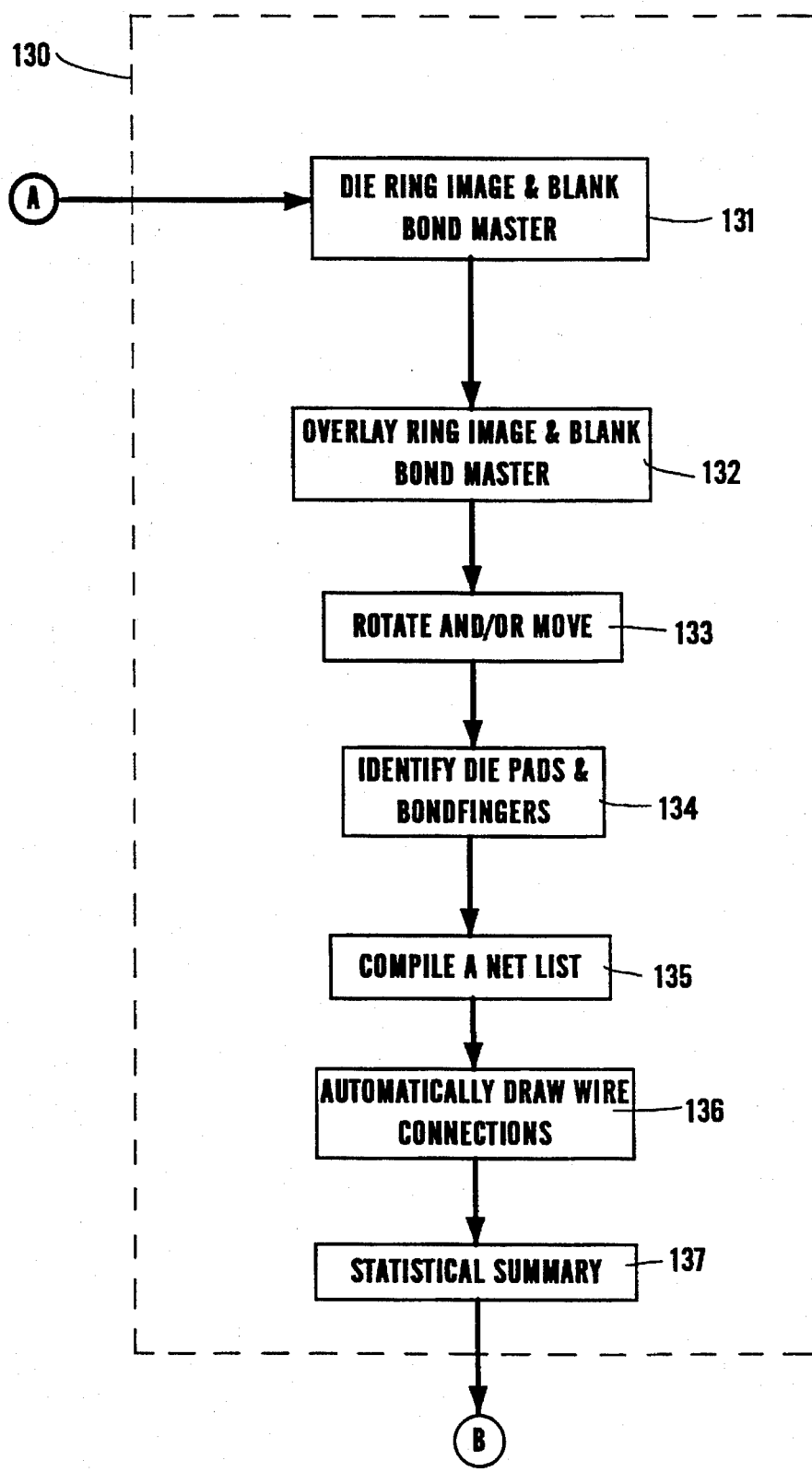
Figure 4C:
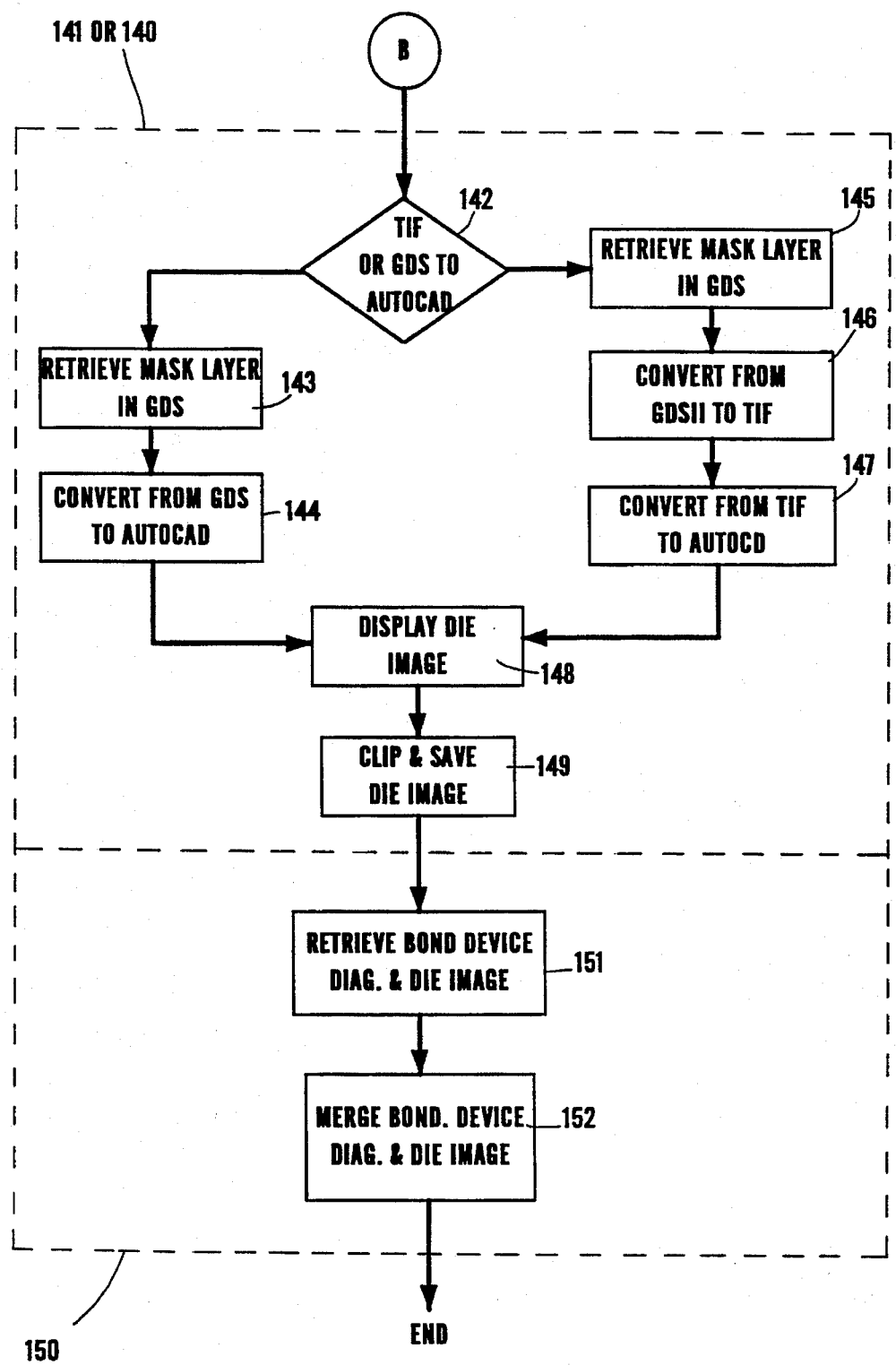

The present invention includes user interfaces 100 and 102 created by a program, as shown in FIGS. 3C and 3D. When an engineer (product or design engineer) logs on at a work station, a novel program is executed to access the user interfaces 100 and 102 for the build sheet. The steps for using the interface will be described in reference to FIGS. 3C and 3D and the FIG. 4 flow chart. As the program is executed, the user interface 100, illustrated in FIG. 3C, is displayed on the display screen 46 of the work station 42.

The engineer first executes the "DataBase" icon 110 or command, and the server 40 accesses the central database 52 having AutoCAD files of all the package families (step 111). As shown in FIG. 3D, the work station displays a second user interface 102 for the engineer to review all the packages available in a chosen package family. Information about the lead count, parts number, whether the package is a production type or prototype, X and Y dimensions of the die attached area, etc., are displayed.

The engineer has two options for determining the appropriate package for the IC chip (step 112). The engineer can review a list of every package available in each family (step 113). Since each family may have hundreds of different packages to review, this option is time consuming. A more efficient option to determine the appropriate package is to input the lead count and/or the actual die size, i.e., X and Y dimensions of the IC chip (step 114). The program automatically narrows down the list to packages having lead count and/or die attach area meeting the minimum die attach clearance (step 115).

For example, if the engineer inputs the actual X and Y dimensions of 0.15 inch by 0.15 inch, the program automatically adds 0.04 inch, where 0.02 inch is, for example, a minimum die attached clearance, and hence, 0.04 is the cumulative of both left and right side die attached clearances in the X and Y dimensions. A limited list of packages with die attach area of 0.19 inch by 0.19 inch or larger is displayed. The engineer selects the appropriate package from the limited list.

Figure 5A:
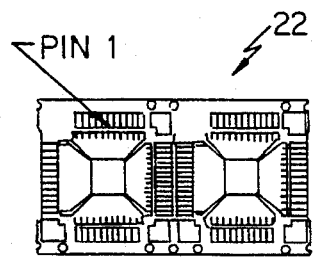
FIGS. 5A, 5D and 5H are drawings indicating the location of die pad 1.
Figure 5B:
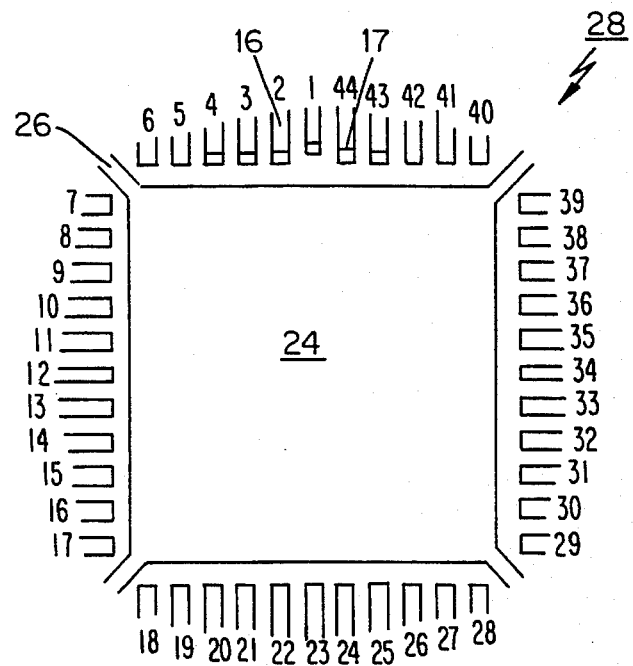
FIG. 5B is an image of a bonding device diagram which has been tagged or made smart.
Figure 5C:
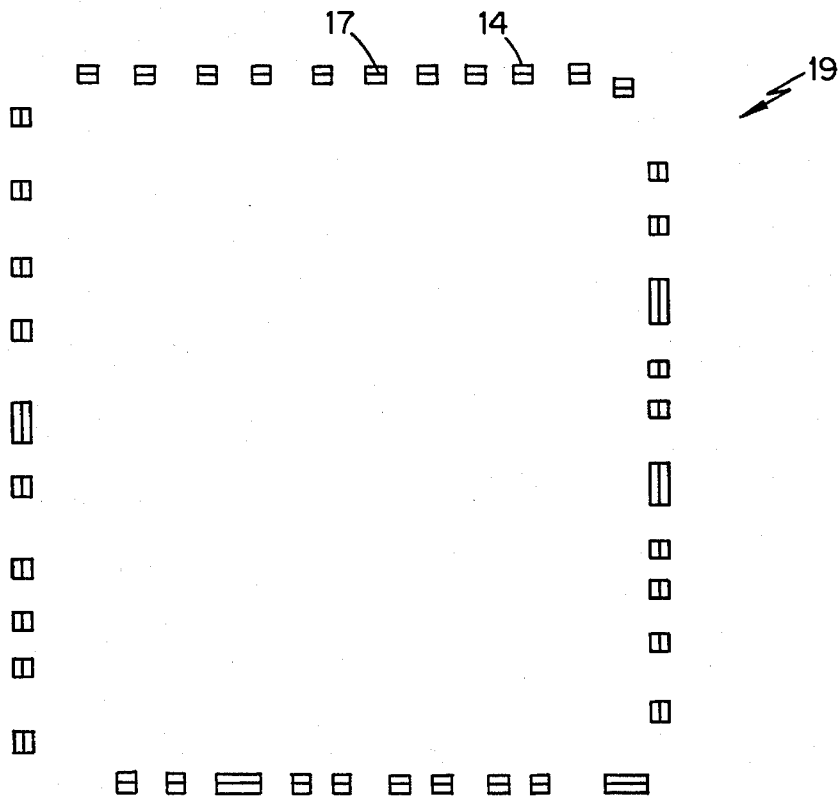
FIG. 5C is an image of a die ring which has been tagged or made smart.
Figure 5D:
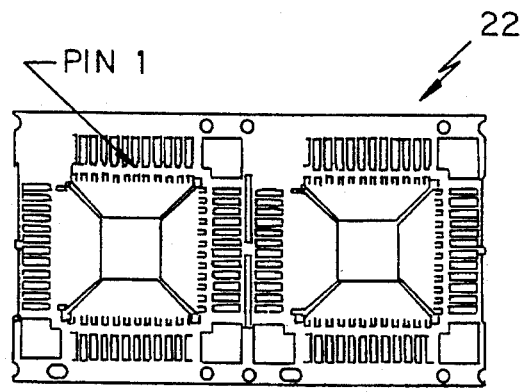

Once the package is chosen (step 116), the server downloads an AutoCAD file of a blank bond master to the hard drive of the work station (step 117). FIG. 5B is an illustration of downloaded blank bond master 28. In addition to the bond fingers 16, die attach area 24 and tiebar 26 with the lead frame drawing 22, the blank bond master also includes a reference line called a "tag" on each bond finger 16. The tags 17 are shown in FIGS. 5B and 5C for illustrative purposes, but are not shown to the engineer during the build sheet creation. The tags 17 are used as target points for wire connection 12 during the wire bonding step. The tags 17 assist the package engineer to place bond lines behind the tip of the leads, normally about 5 mils or 0.005 inches, during manufacture. Since the database 52 is located at a central station, the database 52 can be easily updated as new packages are later developed.

After the wire connections 12 are established, a statistical summary, as shown in Appendix I, is generated so that the engineer can determine whether the IC chip 2 will fit into an existing package. The statistical summary eliminates the need to check a build sheet manually for the connection and bonding problems discussed earlier. Further, a system administrator may use the statistical summary to back-track or troubleshoot help calls from engineers. Since the statistical summary includes the time, date and directory of the saved files, the system administrator also does not need to rebuild the bonding device diagram. Finally, a package engineer may verify manufacturability by reviewing the statistical summary of the completed design, rather than laboriously reviewing a difficult to interpret paper copy of a manually produced build sheet (as provided in the prior art method).

The X and Y dimensions in the "Die Extents" entry indicate the die size of the IC chip 2 without the die ring while the "WITH Scribe Line Added" entry indicates the die size with the die ring. As shown, the design rule for the die attach clearance is violated for the die with the scribe line. Other design rule entries indicate the minimum die attach (D/A) clearance in the X and Y directions, minimum wire space at the die pad (DP) and bond finger (BF), the die pad minimum width and gap, and maximum wire length and angle.

The "Minimum WireSpace" entry specifies the distance between wires on the same die pad or bond finger. The "Die Pad Minimum Width" entry will dictate how may wires can be fitted onto a single die pad. The "Die Pad Minimum Gap" entry specifies the minimum distance between the die pads to prevent the tail of a wire from crossing into an adjacent die pad. As discussed above, the wires 6 cannot exceed a maximum length and angle. The design rules are fixed for all the packages, but as can be appreciated, the design rules can be customized for each package type.

The "Min/Max DiePad Values encountered" entry represents the actual minimum and maximum values of the width, depth and gap as specified in the design rules. The "Pitch" entry is determined based on the addition of the width and the gap. The engineer or system administrator can compare the design rule values with the actual values to quickly determine if any of the rules are violated and whether multiple wires will fit onto the same die pad or bond finger.

Page 2 of Appendix I includes a chart for indicating wire violations with codes indicated at the bottom of page 1 of Appendix I. For example, the wire connection between die pad number 16 and bond finger number 17 has a wide angle (WA), i.e., the angle is greater than the design angle of 38 degrees. If there are violations, the engineer can move and/or rotate either the die ring image and/or blank bond master to correct the problems. The summary statistics also indicates the minimum and maximum wire length and angle to determine the average wire length and angle. The average wire length and the number of wire bonds are used to determine the total wire length required for each IC chip package.

After the completion of the download, the engineer either chooses the "Suggest Die" 120 or "Die Cleaner" 121 icon or command from the interface (step 122). The "Suggest Die" icon 120 or command is chosen if a design engineer could not come up with an appropriate die ring design. In other words, the design engineer knows the circuitry of the IC chip, but does not understand the packaging of the IC chip. By choosing the suggest die icon or command, the program analyzes the layout of the package to provide the appropriate die ring design for the IC chip (step 123). Such a situation rarely occurs, but the program provides the suggest die as a safety and back-up mechanism. Usually, the user chooses the "Die Cleaner" icon 121 or command from the user interface.

Figure 1:
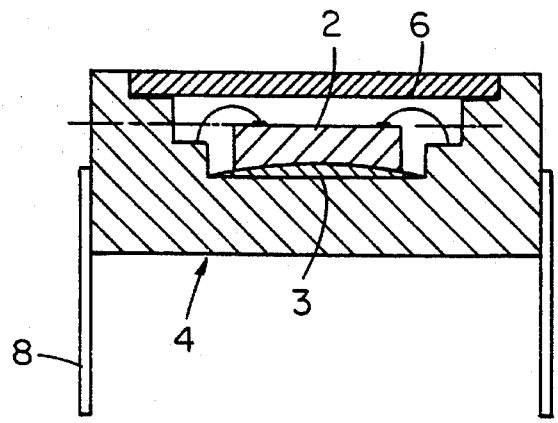
FIG. 1 is an illustration of an IC chip encapsulated in a package with wire connections.
Figure 2A:
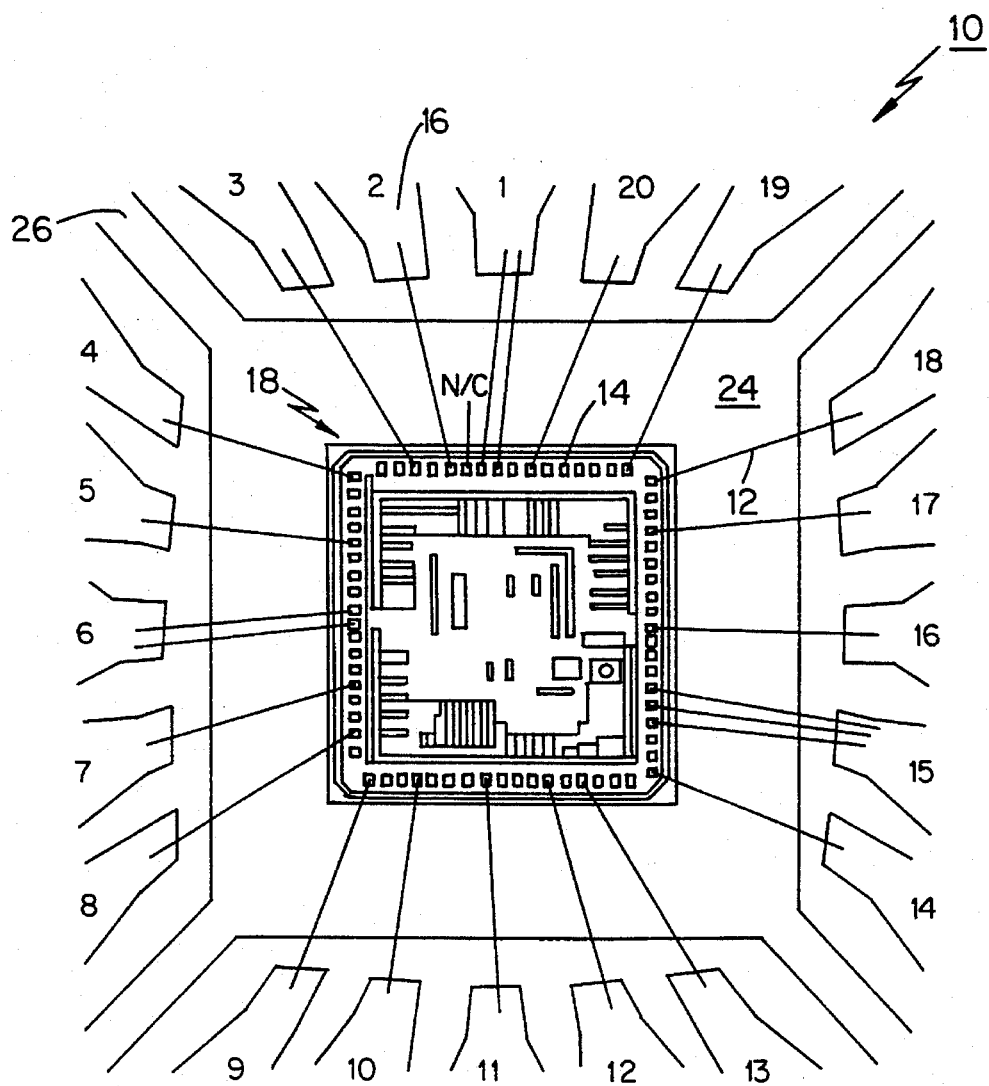
FIG. 2A is an illustration of a bonding device diagram which is used during a manufacture of an IC package.
Figure 2F:
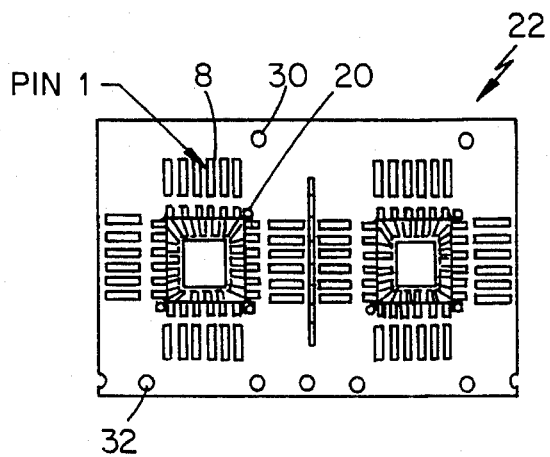
Figure 2G:
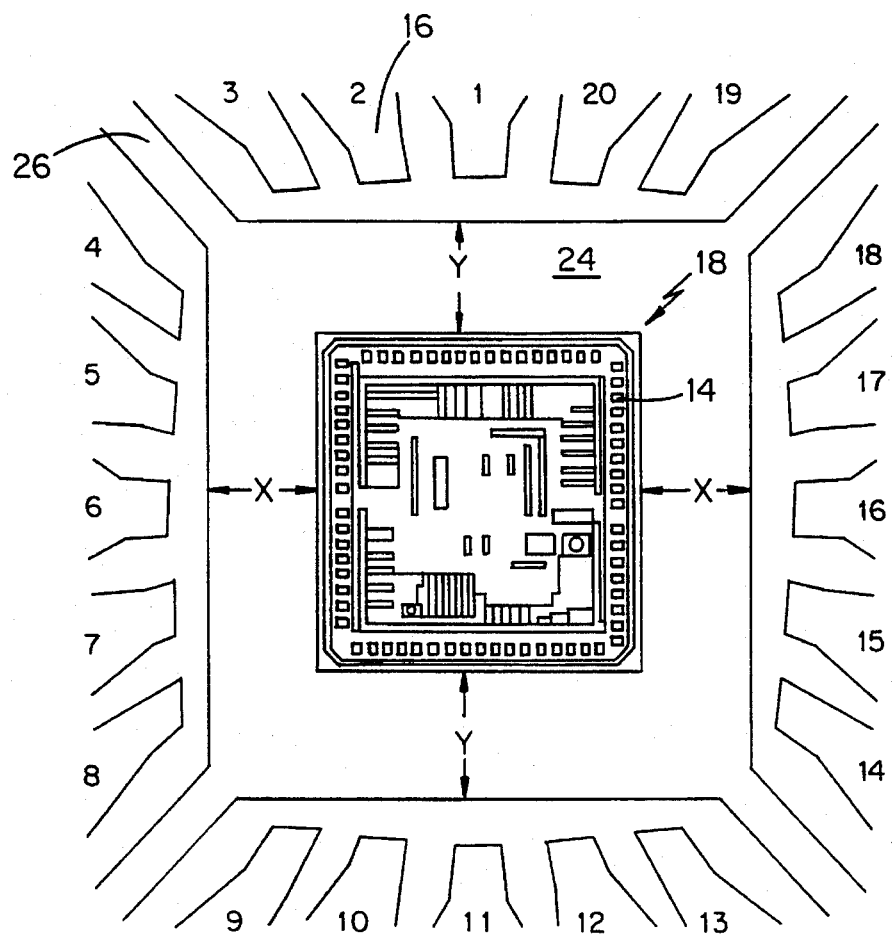
FIG. 2G is an illustration of an die image plot overlying the blank bond master in a conventional build sheet.

When the "Die Cleaner" icon 121 or command is executed, the program extracts a die ring geometry, distinguishes die pads from miscellaneous objects and tags the die pads, as shown in FIG. 5C, from a mask layer used to manufacture the IC chip (steps 124–127). A die ring image 19, illustrated in FIG. 5C, is preferable compared to a die image plot of FIG. 2B for efficiency and management. As discussed earlier, the conventional die image plot 18 includes a complete die ring and the die image. The database file to store such a complete die plot requires between 10 and 400+ megabytes storage, an image file too large to manage (downloading and processing such an image from the database to work station may require several hours). A die ring image 19 is a much smaller file size, e.g., 50 kilobytes, and hence, can be easily managed.

To create the die ring image 19, a die engineer provides to a product engineer a mask layer of the die pads 14 used during the manufacture of the IC chip 2. An image file of the mask layer is then saved in the central database 52 in a GDSII format. As can be appreciated, the image file can be stored on a diskette and given to the engineer for use during the build sheet. The image file of the mask layer is retrieved to be converted from the GDSII format to an AutoCAD format, since the program running the wire bonding routines is an AutoCAD program (steps 124 and 125). After conversion, the program distinguishes miscellaneous objects present in the AutoCAD file from the die pad rings. An averaging technique is used to determine whether an object in the file is a die pad or a miscellaneous object (step 126). The program compares one object to another, and if the dimensions differ greatly from a die pad, the program determines the object not to be a die pad. In other words, the program has "intelligence" to determine whether an object in the file is a die pad.

Once all the die pads 14 have been identified, the program stores the die ring image 19 and miscellaneous objects in a file, but in different layers (step 128). Although not shown, die pad objects and the miscellaneous objects are displayed at the work station in green and red, respectively (step 129). The miscellaneous objects are saved for reference purposes, and the program does not destroy any of the data.

Figure 5E:
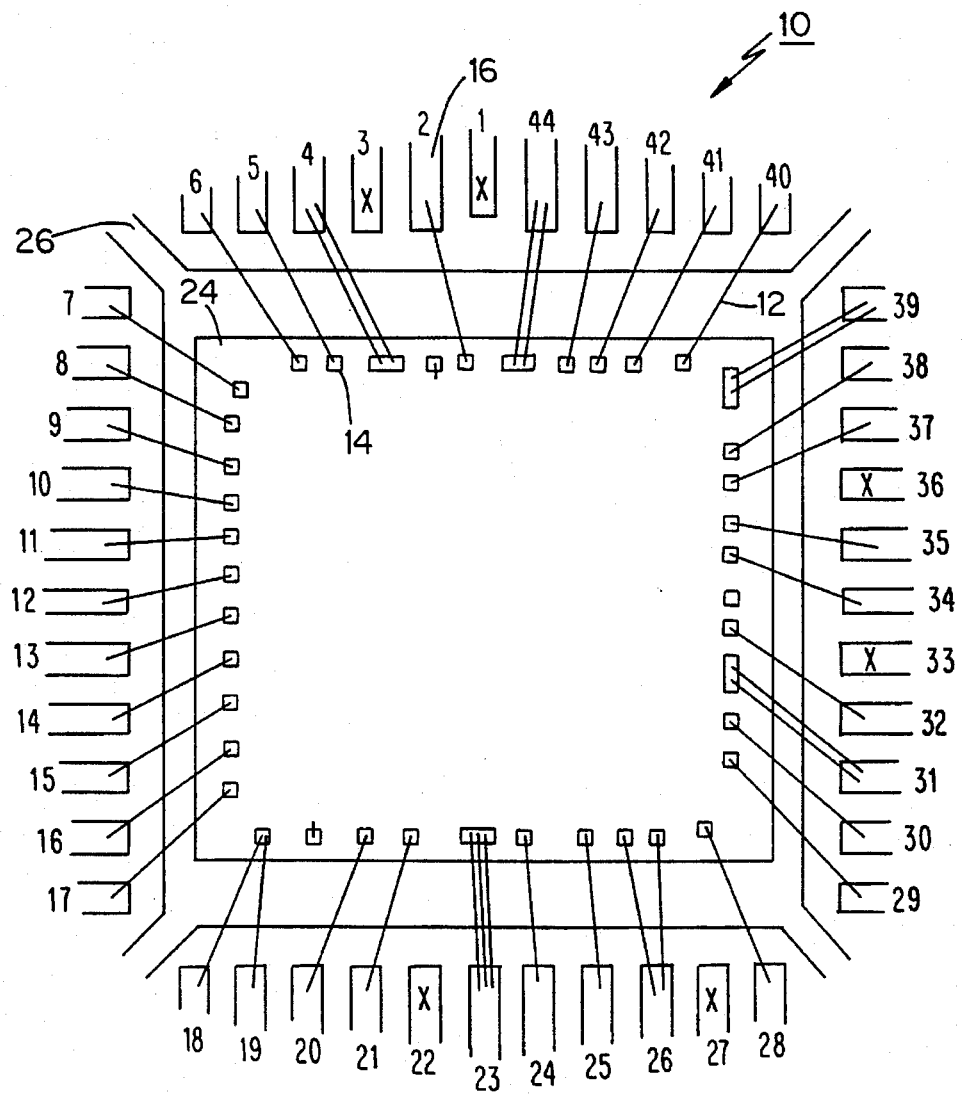
FIG. 5E is a bonding device diagram without a die image of a build sheet.

The "WireBond" icon 130 or command is then executed to create the bonding device diagram 10 (without the die image), as illustrated in FIG. 5E. The image files of the blank bond master 28 and the die ring 19 saved in the hard disk of the work station are retrieved (step 131) and displayed on the screen 46 of the work station 42 with the die ring image 19 overlaid on the die attach area 24 of the blank bond master 28 such that the minimum die attach clearance is satisfied (step 132). The engineer can also rotate the die ring image 19 and/or blank bond master ±90 degrees and/or increments thereof for proper alignment (step 133). Based on a net list (described hereinafter), wire connections 12 are drawn between the die pads 14 and bond fingers 16.

Unlike the conventional build sheet, the scales between the blank bond master and the die ring image is 1 to 1. Such scaling is advantageous since the same die ring and bond fingers can be used when the IC chip size is reduced due to future improvements in IC processing technology. For example, if an IC chip is constructed using 0.5 micron technology, and later 0.25 micron technology becomes available, the same blank bond master 28 and the die ring image 19 can be used with the die ring image 19 reduced in size by 50%. Hence, a determination can be easily made whether an IC chip manufactured using 0.25 micron technology will fit into the same package.

Prior to wirebonding, die pad number 1 and bond finger number 1 must be identified using eight possible reference locations on the die ring image 19 and the blank bond master 28, as well as specifying the direction of increasing die pad numbering clockwise or counter clockwise (step 134). The eight possible reference locations are top left, top right, left top, left bottom, bottom left and bottom right, right top and right bottom. When the engineer chooses the top left reference location, the top left corner of the die ring image is highlighted. Since the engineer knows which die pad corresponds to die pad 1, the user counts back from die pad 1 to the left hand corner to determine that the left hand corner die pad corresponds to die pad number 5 and inputs the die pad number. The program then "backtracks" to identify die pad number 1. Thereafter, all the other die pads are identified and saved as a file in the memory of the work station. Using a similar process, identification of the bond fingers is saved as a file in the memory. In FIG. 5C, the bond fingers are numbered for illustrative purposes.

Figures 5F, 5G:
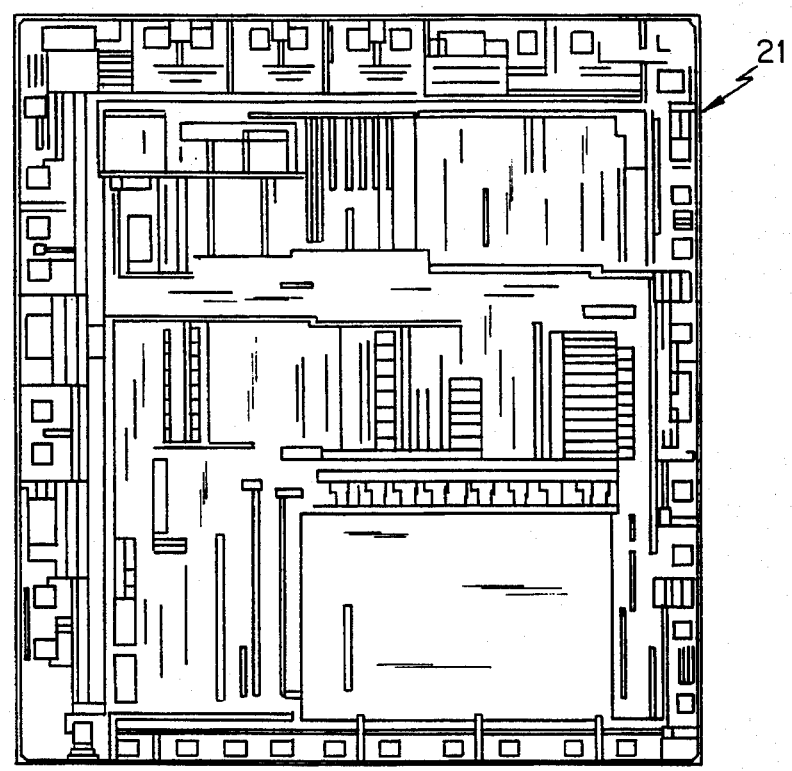
FIG. 5F is a net list indicating wire connections of bond pads to each die pad.
FIG. 5G is an illustration of a die image.
Figure 5H:
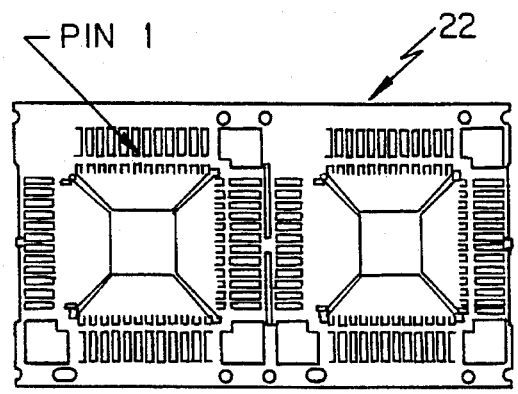

After identification of the bond fingers and die pads, a net list is compiled (step 135), as shown in FIG. 5F. The net list is an ASCII text file consisting of two columns. The first column sequentially lists the identified die pads 14 which can be automatically generated by the program or manually entered by the engineer on the keyboard. The second column indicates which bond fingers are connected to the die pads and entered manually by the engineer. As shown in FIGS. 5E and 5F, bond finger 2 is connected to die pad 1, and there is no connection to die pad 2 which is indicated by "O" on the net list. Further, die pad 3 is double bonded to bond finger 4. Bond fingers 18 and 19 are both connected to die pad 17, and for die pad 21, there is a triple bond from bond finger 23. The numbers separated by commas in the bond finger column indicate multiple bonds to the die pad and zero indicates no connection to the die pad.

Based on the net list, the wire connections 12 between the die pads 14 and bond fingers 16 are automatically drawn to form the bonding device diagram 10, as illustrated in FIG. 5C, where "X" and "nicks" on the bond fingers 16 and die pads 14, respectively, represent no connections (step 136). When the wire connections 12 are drawn, the program automatically takes into account all the factors discussed in the background of the art and generates the statistical summary (step 137). Hence, the engineer does not have to repeatedly experiment with the bonding device diagram to satisfy the design rules for manufacturing the IC chip.

Following the wire bonding step, a die image 21, as illustrated in FIG. 5G, is created. The engineer has two choices, which are shown in FIG. 3C as "TIF to AutoCAD" 141 or "GDS to AutoCAD" 140 icon/command (step 142). As described above, various mask layers are used to manufacture the IC chip. Similar to the "Die Cleaner" step, a mask layer which best represents the die image is chosen and saved as an image file in the central database in a GDSII format. When the "GDS to AutoCAD" icon 140 or command is executed, the file saved in the GDSII format is retrieved and converted to the AutoCAD format (steps 143–144).

Alternatively, when the "TIF to AutoCAD" icon 141 or command is executed, the file saved in the GDSII format is retrieved and converted to the TIF format (steps 145–146) and then to the AutoCAD format (step 147). The engineer usually uses the "TIF to AutoCAD" icon 141 or command due to a smaller file size in the TIF format. For example, an image file in GDSII format could be 10–400+ megabytes while an image file in TIF format is about 300 kilobytes. When the die image 21 is displayed on the work station screen 46, the engineer can clip, i.e., cut and paste, the appropriate boundaries of the die image 21 and can save the image as a file in the work station hard disk (steps 148–149).

Figure 5I:
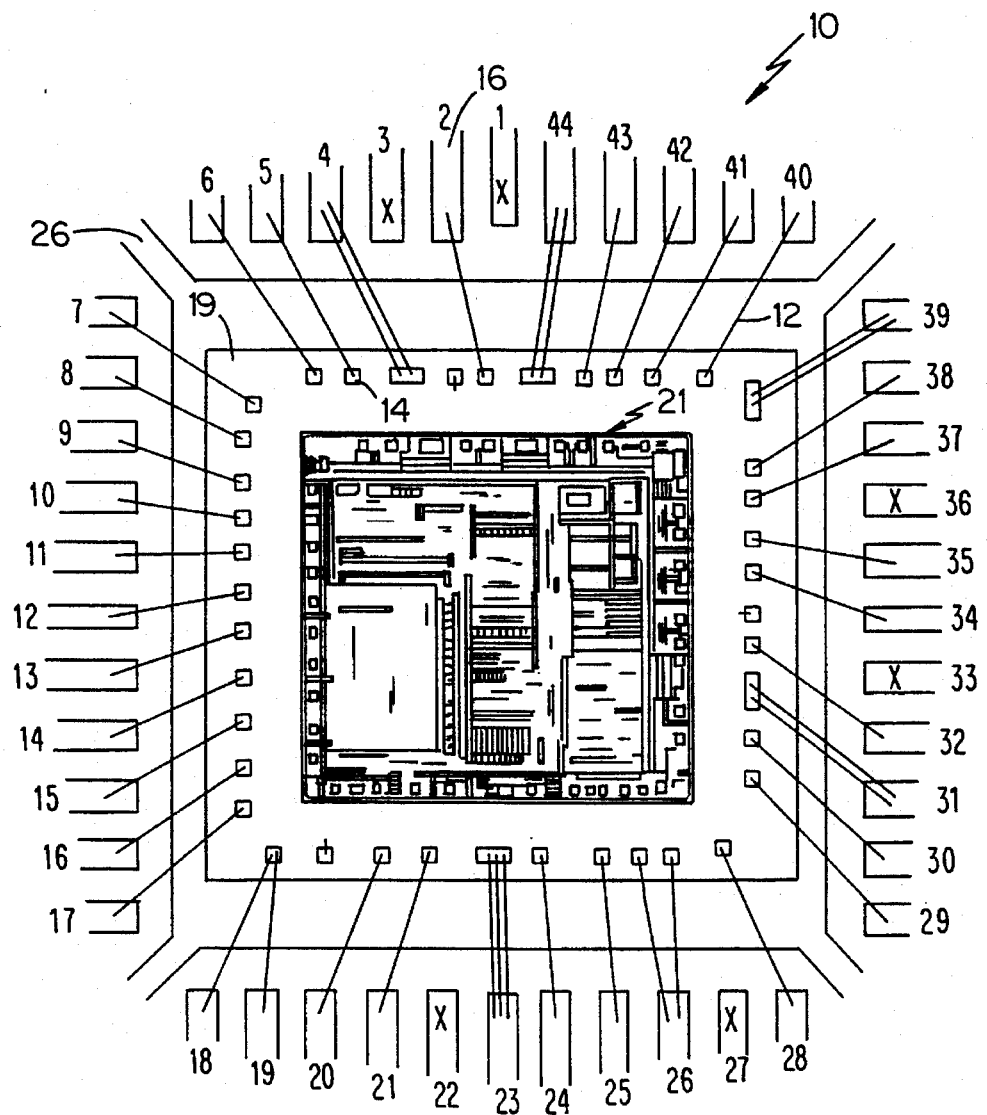
FIG. 5I is an illustration of a die image merged with the bonding device diagram of FIG. 5C.

Thereafter, the "Die Image Merge" icon 150 or command is executed to retrieve the bonding device diagram 10 and the die image 21 and to place the die image 21 onto the bonding device diagram 10 (steps 151–152), as illustrated in FIG. 5I. As shown, the die ring 19 is outside of the die image 21 since the die image 21 is, for example, 15% smaller than the die pad ring image 19. The die image 21 is useful as a reference to properly align the IC chip 2 during the actual manufacturing, and yet, the smaller image allows clear visibility of the accurately scaled die ring and wire connections without interference from the die image plot. Using the distinct white spaces in the die image 21, the package engineer properly aligns the IC chip 2 onto the die attach area 24. As can be appreciated, if a misaligned IC chip is glued to the die attach area 24, the wires 6 will be improperly connected, and the entire IC chip must be discarded. Once the "Die Image Merge" step is completed, the engineer exits the program and the remaining steps for manufacturing the packaged IC is the same as the conventional process.

With the user interface 100, a bonding device diagram 10 can be created within 15 to 20 minutes. The engineer executes the "DataBase" icon 110 or command to select an appropriate package for the IC chip 2, and a blank bond master 28 is downloaded to the hard disk of the work station 42. The engineer can choose either the "Suggest Die" icon/command 120 or the "Die Cleaner" icon/command 121 to create an image file of the die pad ring based on a mask layer best representative of the die pad ring. Thereafter, the die pads 14 and bond fingers 16 are identified and a net list is complied when the "WireBonding" icon 130 or command is executed to create a bonding device diagram 10 without the die image. The die image 21 is created based on a mask layer best representative of the die using either the "TIF to AutoCAD" icon/command 141 or the "GDS to AutoCAD" icon/command 140. The "Die Image Merge" icon/command 150 merges the die image 21 with the bonding device diagram 10 to complete the build sheet. The creation of the die image incurs an additional time of approximately 10 minutes, but need not be repeated again thereafter.

The interface 100 displays, at the bottom of the screen, the percentage for completing the build sheet. Since there are basically five steps, the percentage completed is incremented by 20% after each step. Further, each step of the build sheet is modular such that the engineer can stop at each step and leave the work station. The engineer can restart where he/she left off and is not required to start the program from the first step all over again.

As illustrated in the statistical summary of Appendix I, the program accounts for the factors causing the problems related to the die attach area, wire length, wire angle, wire crossing or touching and width of the wires relative to the width of the die pad and bond fingers. The interface 100 allows the engineer to easily ascertain and quickly remedy the problems by fine tuning the bonding device diagram 10, e.g., move or rotate the die ring image 19 and/or the blank bond master 28. If the design rule violations cannot be corrected, the engineer can easily repeat the first step to pick another blank bond master of a different package from the limited list since the automated build sheet only takes 15 to 20 minutes to complete.

The automation of the build sheet is also advantageous since the engineer or technician does not waste time manually photocopying, pasting, measuring and drawing the die image plot 18, blank bond master 28 and wire connections 12. The automation of the build sheet is simple and efficient compared to the conventional build sheet.

While the present invention has been described in specific embodiments thereof, it is evident that many alternatives, modifications and variations will be apparent to those skilled in the art.

APPENDIX I

```
    WB Version: [6.0d]    By Georg Kuhnke
        Modified and Updated by Kris Chou
Date/Time: 1994/08/31 16:25:21
Working Dir.:    /and/msd2/2/ftp/pub/sun/todd
DIE File:        /and/msd2/2/ftp/pub/sun/todd/1193pad_die
09 BondMaster:   09-0009017_AE
  Dimensions in INCHES, unless otherwise shown
  User Inputs:
Die Rotation (degrees):    0.0
Percent Shrink:           35.0%
SCRIBE LINE Added:        YES
    Die Data ==== (Die Extents)

ORIG. DIE SIZE (X/Y):         0.286  0.263
SHRUNK DIE SIZE (X/Y):        0.186  0.171
D/A Area (X/Y):               0.230  0.230
D/A Clearance (X/Y):          0.022  0.030
    Die Data ==== (WITH Scribe Line Added)

ORIG. DIE SIZE (X/Y):         0.322  0.282
SHRUNK DIE SIZE (X/Y):        0.209  0.183
D/A Area (X/Y):               0.230  0.230
D/A Clearance (X/Y):          0.011  0.024
```

APPENDIX I -continued

```
>>>>DieAttach Clearance Violated!!<<<<

Design Rules:

Min D/A Clearance X =     0.020100
Min D/A Clearance Y =     0.020100
Min WireSpace at DP =     0.003000
Min WireSpace at BF =     0.003000
Die Pad min Width =       0.004000
Die Pad min Gap =         0.001000
Max WireLength =          0.150000
Max WireAngle (deg) =     38.0
Min/Max DiePad Values encountered:

Width (min/max) =     0.004775   0.011413
Depth (min/max) =     0.004775   0.005016
Gap (min/max) =       0.005881   0.017056
Pitch (min/max) =     0.010656   0.023687
Die Pad Violations: (W = Width, G = Gap, * = Both)

123456789+123456789+123456789+123456789+123456789+123456
Wire Violation Code Legend XW: Crossing Bondwires
DP: Bond on Die Pad too close to previous bond
BF: Bond on Bondfinger too close to previous bond
WL: Wirelength Violation
WA: WireAngle Violation
MV: Bondfinger bondpoint was moved for PGA ortho rule
OA: WireAngle is greater than Max PGA wireangle
DP#      -BF#     [WLEN == ANG]      Wire Violations DP 16    -BF 17   [0.061    38.7]                WA
DP 17.2  -BF 19   [0.056    -5.0]    DP
DP 21.2  -BF 23.2 [0.057     2.9]    DP    BF
DP 21.3  -BF 23.3 [0.057     2.6]    DP    BF
DP 27    -BF 29   [0.069   -45.0]                WA
DP 28    -BF 30   [0.064   -40.3]                WA
DP 29.2  -BF 31.2 [0.061   -37.3]          BF
WireBond Violations: ('-' = N/C, '.' = bfpt moved)
(NOTE: in connect sequence, including multiples)

-       * *_       **       ** * _
Summary Statistics: [WLEN == ANG]
MIN (abs):       0.047      2.3
MAX (abs):       0.069     45.0
AVG (abs):       0.057     20.7
   # of Die Pads:        41     (3 are N/C)
   # of BondFingers:     44     (6 are N/C)
   # of WireBonds:       45
```

We claim:

1. A computer readable medium storing a set of instructions for implementing and executing an automated build sheet operation to manufacture integrated circuit (IC) packages, the set of instructions controlling a system operating in X-Windows having a computer coupled to a plurality of work stations and a database storing images of blank bond masters and die rings so as to instruct said computer to execute a plurality of steps comprising:

a first step of selecting an image file of a blank bond master having an image of a plurality of bond fingers and a die attach area;

a second step of selecting a die ring image having an image of a plurality of die pads of an IC chip; and a third step of automatically illustrating wire connections between the die pads and bond fingers to form a bonding device diagram.

2. The computer readable medium of claim 1, wherein the set of instructions instruct the computer to execute the further steps of:

a fourth step of creating a die image of an IC chip; and a fifth step of merging the die image with the bonding device diagram.

3. The computer readable medium of claim 1, wherein said first step of selecting comprises:

a first substep to access the database;

a second substep to limit a number of packages; and a third substep to automatically save an image file of the blank bond master in a storage device of the work station.

4. The computer readable medium of claim 1, wherein said second step of selecting comprises:

a first substep to retrieve from the database an image file of a mask layer used during the manufacture of the IC chip to form the die ring and saved in GDSII format;

a second substep to convert the image file in GDSII format into AutoCAD format;

a third substep to distinguish die pads from miscellaneous objects; and a fourth substep to automatically save an image file of the die ring in a storage device of a work station.

5. The computer readable medium of claim 1, wherein said third step of automatically illustrating comprises:

a first substep to overlay the die ring image on the blank bond master;

a second substep to compile a net list indicative of the wire connections of bond fingers to each die pad; and a third substep to automatically draw the wire connections based on the net list.

6. The computer readable medium of claim 2, wherein said fourth step of creating comprises:

a first substep to retrieve from the database an image file of a mask layer used during the manufacture of the IC chip and saved in GDSII format; and a second substep to convert the image file in GDSII format to AutoCAD format.

7. The computer readable medium of claim 2, wherein said fourth step of creating comprises:

a first substep to retrieve from the database an image file of a mask layer used during the manufacture of the IC chip and saved in GDSII format;

a second substep to convert the image file in GDSII format to TIF format; and a third substep to convert the image file in TIF format to AutoCAD format.

8. A system having a central computer coupled to a central database and a plurality of work stations for automating a build sheet used in the manufacture of integrated circuit (IC) packages to connect wires between die pads of an integrated circuit chip and bond fingers of a package, the system comprising:

means for creating a blank bond master having an image of a plurality of bond fingers and a die attach area;

means for creating a die ring having an image of a plurality of die pads of the IC; and means for automating symbolic wire connections between the die pads of the die pad ring and the bond fingers of the blank bond master to create a bonding device diagram.

9. The system of claim 8, wherein the symbolic wire connections are graphic illustrations of wire connections between the die pads and bond fingers.

10. The system of claim 8, wherein said blank bond master creating means comprises:

means for accessing the database including a list of all packages of all package families; and means for selecting a package.

11. The system of claim 10, wherein said selecting means comprises:

means for reviewing all packages in the package families; and means for limiting a number of packages for review based on at least one of minimum X and Y die attach clearance and lead count.

12. The system of claim 10, wherein said blank bond master creating means further comprises means for automatically saving an image file of the blank bond master in a storage device of one of the work stations.

13. The system of claim 8, wherein means for creating the die ring comprises:

means for retrieving from the database an image file of a mask layer used during the manufacture of the IC chip to form the die ring and saved in GDSII format;

means for converting the image file in GDSII format into an image file in AutoCAD format;

means for distinguishing die pads from miscellaneous items in the image file in AutoCAD format; and means for automatically saving an image file of the die ring in a storage device of one of the work stations.

14. The system of claim 8, wherein means for automatically connecting the wires comprises:

means for retrieving the blank bond master and the die ring;

means for overlaying the die ring image on the blank bond master;

means for moving or rotating at least one of the blank bond master and die image;

means for identifying the die pads and bond fingers;

means for tagging each die pad and bond finger;

means for compiling a net list indicative of the wire connections of bond fingers to each die pad; and means for automatically drawing the wire connections based on the net list; and means for generating a statistical summary indicating an overview of the wire connections.

15. The system of claim 8, wherein means for automatically connecting the wires comprises:

means for automatically determining a minimum die attach clearance;

means for automatically determining a maximum wire length;

means for automatically determining a maximum wire angle;

means for automatically determining a wire cross; and means for automatically determining a width of the wires.

16. The system of claim 8 further comprising means for creating a die image.

17. The system of claim 16, wherein means for creating the die image comprises:

means for retrieving from the database an image file of a mask layer used during the manufacture of the IC chip and saved in GDSII format.

18. The system of claim 17, wherein means for creating die image further comprises:

means for converting the image file in GDSII format to AutoCAD format.

19. The system of claim 16, wherein means for creating the die image comprises:

means for retrieving from the database an image file of a mask layer used during the manufacture of the IC chip and saved in GDSII format;

means for converting the image file in GDSII format to TIF format; and means for converting the image file in TIF format to AutoCAD format.

20. The system of claim 16, wherein means for creating the image file of the die comprises:

means for clipping the die image; and means for saving the clipped die image in a storage device of the work station.

21. The system of claim 8 further comprising means for merging the die image to the bonding device diagram.

22. The system of claim 21, wherein said means for merging further comprises means for retrieving the bonding device diagram and die image from a storage device of the work station.

23. The system of claim 8, further comprising means for suggesting the die ring for the IC chip.

24. The system of claim 8, wherein said blank bond master is created from an internal artwork of a lead frame for the package.

25. The system of claim 8, wherein the die image is smaller than the die ring and used as a reference for placing the IC chip on the die attach area during manufacturing of the IC packages.

26. The system of claim 8, wherein the blank bond master includes an image of a tiebar to connect the die attach area to a lead frame of the package.

27. A method for a build sheet used during manufacturing of integrated circuit (IC) packages to connect wires between die pads of an IC chip and bond fingers of a package, the method comprising the steps of:

selecting an image file of a blank bond master having an image of a plurality of bond fingers and a die attach area;

selecting a die ring image having an image of a plurality of die pads of the IC chip; and connecting automatically the wires between the die pads and bond fingers to form a bonding device diagram.

28. The method of claim 27 further comprising the steps of:

creating a die image of the IC chip; and merging the die image with the bonding device diagram.

29. The method of claim 27, wherein said step of selecting the image file of the blank bond master comprises the step of:

accessing a database including a list of all packages of all package families;

reviewing all packages in the package families;

limiting a number of packages for review based on at least one of minimum X and Y die attach clearance and lead count; and automatically saving an image file of the blank bond master in a storage device of a the work station.

30. The method of claim 27, wherein said step of selecting a die ring image comprises the steps of:

retrieving from a database an image file of a mask layer used during the manufacture of the IC chip to form the die ring and saved in GDSII format;

converting the image file in GDSII format into an image file in AutoCAD format;

distinguishing die pads from miscellaneous items in the image file in AutoCAD format; and automatically saving an image file of the die ring in a storage device of a work station.

31. The method of claim 27, wherein said step of connecting the wires comprises the steps of:

retrieving the blank bond master and the die ring image;

overlaying the die ring image on the blank bond master;

moving or rotating at least one of the blank bond master and die ring image;

identifying the die pads and bond fingers;

tagging each die pad and bond finger;

compiling a net list indicative of the wire connections of bond fingers to each die pad; and automatically drawing the wire connections based on the net list; and generating a statistical summary indicating an overview of the wire connections.

32. The method of claim 27, wherein said step of connecting the wires comprises the steps of automatically determining:

a minimum die attach clearance;

a maximum wire length;

a maximum wire angle;

a wire crossing or touching; and a diameter of the wires.

33. The method of claim 28, wherein the step of creating the die image of the IC chip comprises the steps of:

retrieving from a database an image file of a mask layer used during the manufacture of the IC chip and saved in GDSII format; and converting the image file in GDSII format to AutoCAD format.

34. The method of claim 28, wherein the step of creating the die image of the IC chip comprises the steps of:

retrieving from a database an image file of a mask layer used during the manufacture of the IC chip and saved in GDSII format;

converting the image file in GDSII format to TIF format; and converting the image file in TIF format to AutoCAD format.

35. The method of claim 28, wherein the step of creating the die image of the IC chip comprises the steps of:

clipping the die image; and saving the clipped die image in a storage device of a work station.

* * * * *